United States Patent
Chen

(12) 
(10) Patent No.: US 6,315,340 B1
(45) Date of Patent: Nov. 13, 2001

(54) MULTIFUNCTIONAL PICK-UP TOOL

(76) Inventor: Andrew Chen, Room 1003, 10F, No. 96, Sec. 2, Chung-Shan N. Road, Taipei (TW)

(*) Notice: Subject to any disclaimer, the term of this patent is extended or adjusted under 35 U.S.C. 154(b) by 0 days.

(21) Appl. No.: 09/692,675

(22) Filed: Oct. 18, 2000

(51) Int. Cl.[7] ............................... B25J 1/02; B25J 15/06
(52) U.S. Cl. ........................ 294/24; 294/65.5; 294/100
(58) Field of Search ........................... 294/2, 3, 19.1, 294/24, 65.5, 66.2, 99.1, 99.2, 100, 115, 116; 15/104.32; 362/109, 119, 120

(56) References Cited

U.S. PATENT DOCUMENTS

| | | | |
|---|---|---|---|
| 2,320,967 | * | 6/1943 | Dunkelberger ................ 294/100 |
| 2,594,908 | * | 4/1952 | Gaulke et al. ................ 294/100 X |
| 2,947,564 | * | 8/1960 | Winther ........................... 294/100 |
| 4,253,697 | * | 3/1981 | Acosta ........................ 294/65.5 X |
| 4,575,143 | * | 3/1986 | Nast ................................ 294/65.5 |
| 5,615,920 | * | 4/1997 | O'Kane et al. ................ 294/65.5 |
| 5,826,928 | * | 10/1998 | Shang ............................... 294/24 |

* cited by examiner

Primary Examiner—Johnny D Cherry

(57) ABSTRACT

A multifunctional pick-up tool comprises: a central shaft disposed in a tubular body; a battery chamber jointed with the tubular body for storing a battery pack; at least a bulb located at the bottom end of the tubular body; a bundle of conductive cords arranged between the bulb and the battery chamber; a multiheaded claw and a resilient member disposed at a lower and an upper end of the central shaft respectively; an upper and a lower end of the resilient member propped against a push button on the central shaft and a pull knob on the tubular body; and a magnet positioned at the bottom end of the tubular body.

4 Claims, 4 Drawing Sheets

MULTIFUNCTIONAL PICK-UP TOOL

BACKGROUND OF THE INVENTION

1. Field of the Invention

This invention relates generally to pick-up tools, more particularly to a multifunctional pick-up tool equipped with a multiheaded claw, a magnet, and a bulb for picking up small things easily in a limited space.

2. Description of the Prior Art

During maintaining or repairing a car or a motorcycle, it is nothing peculiar to have some small parts or tools, such as screws, washers, rivets, or a spanner, dropped from a technician's palm down to somewhere in a complicated machine chamber. For picking up the dropped things, sometimes the technician may have to make a great effort by holding a flash-light with one hand and a long clamp with the other to exhaust himself just because of a trivial screw.

It seems that not much one can do but wait helplessly on the spot when a key is dropped down into a sidewalk ditch, he cannot even have a chance to make sure if the key is still lying there in the dark ditch. Under this situation, all he needs is a pick-up tool with bulb.

SUMMARY OF THE INVENTION

The primary object of this invention is to provide a multifunctional pick-up tool with a stretchable, spreadable, and closable multiheaded claw disposed in a long tubular body for picking small things up easily in any limited space.

Another object of this invention is to provide a multifunctional pick-up tool equipped with a magnet disposed at a lower end of the pick up tool just by the side of the multiheaded claw, so as to pick up some small metal mechanical parts dropped down in a dim place.

Yet another object of this invention is to provide a multifunctional pick-up tool equipped with a bulb as a light source when seeking to pick up small things in the dark.

In order to realize above said objects, a multifunctional pick-up tool of this invention comprises: a central shaft disposed in a tubular body; a battery chamber jointed with the tubular body for storing batteries; at least a bulb located at the bottom end of the tubular body; a bundle of conductive cords arranged between the bulb and the battery chamber; a multiheaded claw and a resilient member disposed at a lower and an upper end of the central shalt respectively; an upper and a lower end of the resilient member propped against a button on the central shaft and a pull knob on the tubular body; and a magnet positioned at the bottom end of the tubular body for collecting small metal things or parts. The user may push the knob until the multiheaded claw is fully spread outwardly, then release the push knob of the multiheaded claw to shrink back and grasp the target things or adsorb ferromagnetic parts with the magnet in both ways.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
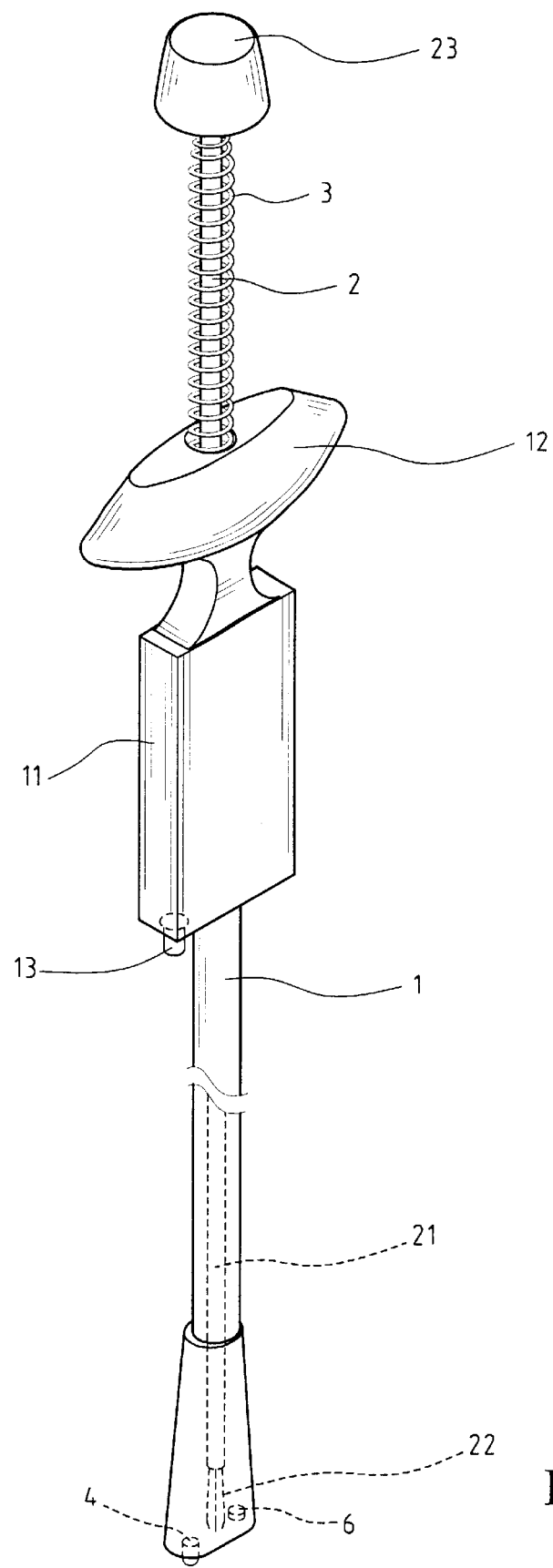
FIG. 1 is a perspective view showing a multifunctional pick-up tool of this invention.
Figure 2:
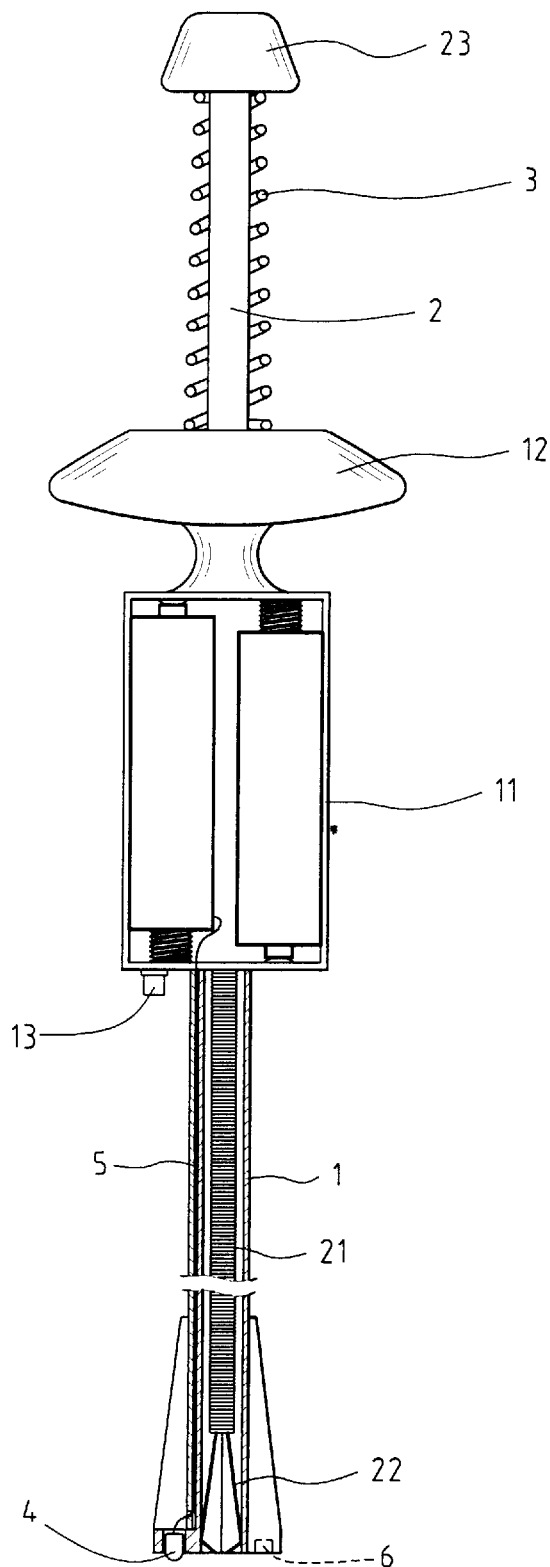
FIG. 2 is a plan view of the multifunctional pick-up tool of this invention.

As indicated in FIGS. 1 and 2, a multifunctional pick-up tool of this invention comprises: a central shaft 2 penetratingly disposed in a tubular body 1; a battery chamber 11 jointed with the tubular body 1 for storing a battery pack; a switch 13 fitted to the battery chamber 11 at a proper position, save a lower end; at least a bulb 4 located at the bottom end of the tubular body 1; a bundle of conductive cords arranged between the bulb 4 and the battery chamber 11 and covered with a shielding coat 5 to avoid unsightliness or wear, wherein the bulb 4 is controlled to be lightened or darkened by the switch 13.

Figure 4:
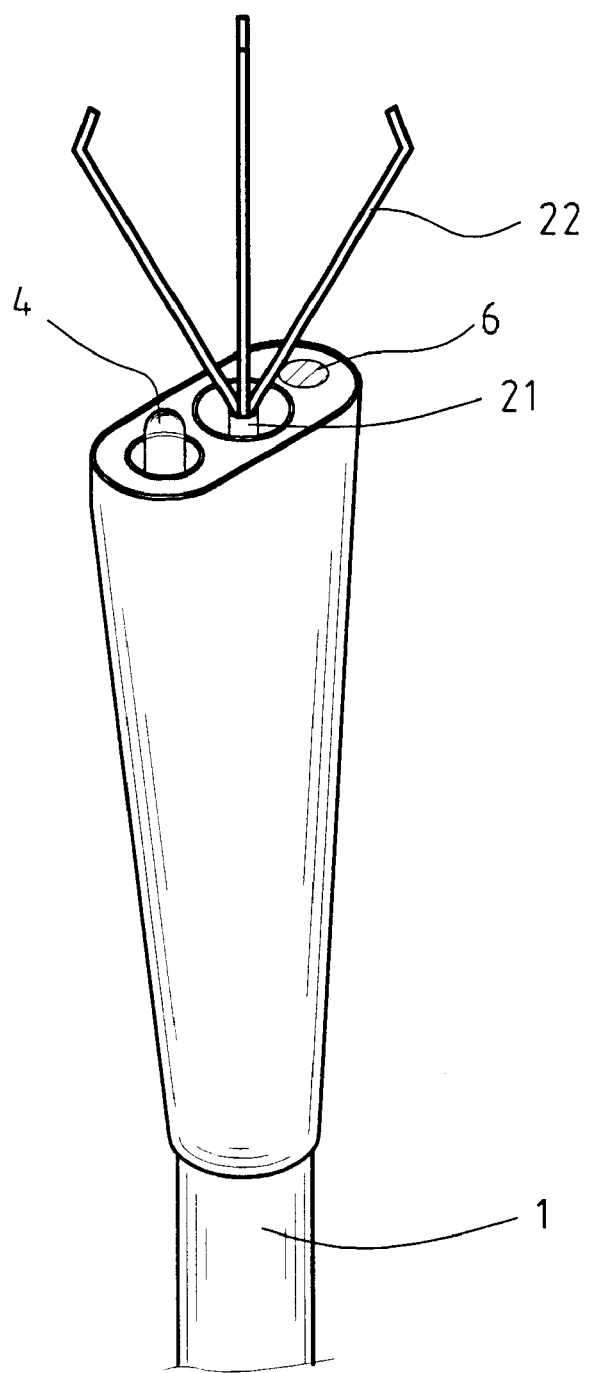
FIG. 4 illustrates a perspective partial view showing relative positions among a multiheaded claw, a bulb, and a magnet of this invention.

Further, a pull knob 12 is fixedly disposed at an upper end of the tubular body 1, and an upper end of the central shaft 2 is protruded over the tubular body 1 and hitched with a resilient member 3, wherein a push button 23 is fixedly jointed to the upper end of the central shaft 2 so that two ends of the resilient member 3 are pressing against the bottom end of the push button 23 and the top end of the pull knob 12 respectively. Moreover, a flexible bar 21 (a helical resilient bar for example) is coupled to a lower end of the central shaft 2, wherein a multiheaded claw 22 (a tripleheaded one in this case) is disposed at the bottom end of the flexible bar 21, and an outer diameter encircled by a plurality of fully extended claws of the multiheaded claw 22 is greater than the bore of the tubular body 1. A magnet 6 is fitted into the bottom end of the tubular body 1 as shown in FIG. 4.

Figure 3:
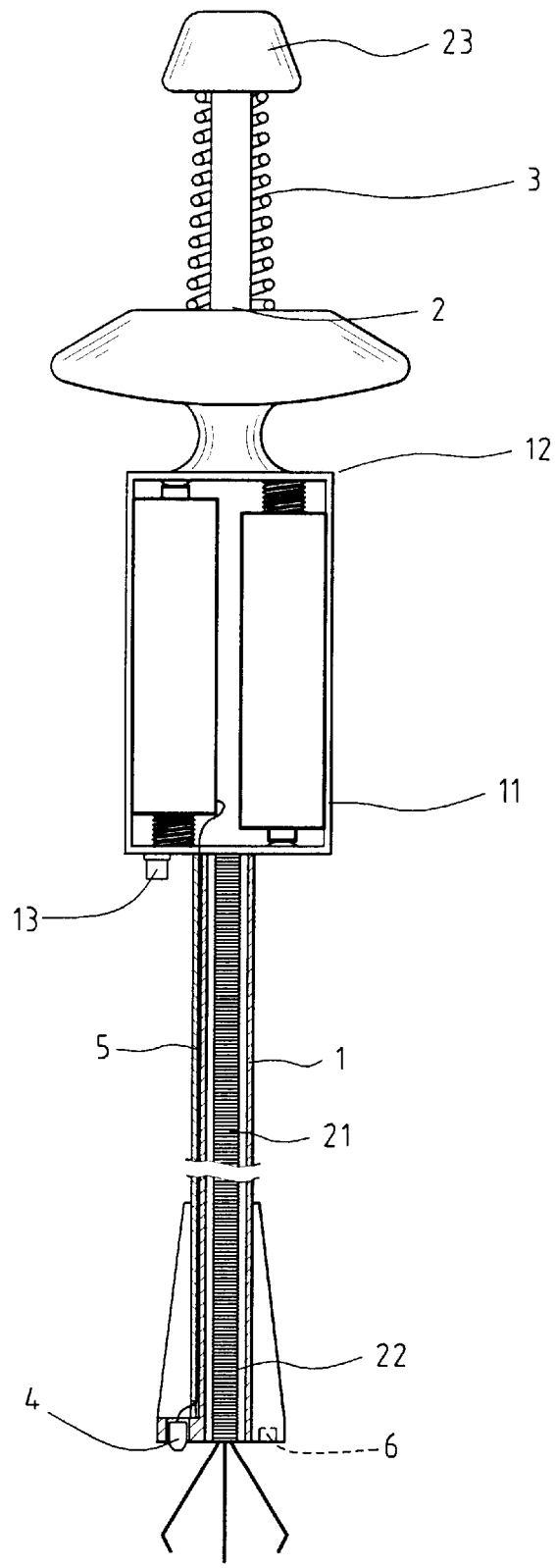
FIG. 3 illustrates action of the multifunctional pick-up tool of this invention shown in FIG. 2.

During operation of this invention, a user is requested to have his palm propped downwards against the push button 23, then squeeze to the pull knob 12 and push out the central shaft 2 to allow the multiheaded claw 22 to fully spread outwardly as shown in FIG. 3. At the moment, the user may aim the spread multiheaded claw 22 at a target, then release the pull knob 12 to have the compressed resilient member 3 restored to force the tubular body 1 to descend over the bottom end of the central shaft 2 so that the multiheaded claw is retracted to clamp at the target.

Besides, the bulb 4 and the magnet 6 are especially helpful for picking small things at a dim place or for picking ferromagnetic matters respectively.

In the above described, at least one preferred embodiment has been elucidated with reference to drawings annexed, it is apparent that numerous variations or modifications may be made without departing from the true spirit and scope thereof as set forth in the claims below.

What is claimed is:

1. A multifunctional pick-up tool, comprising:
    a tubular body jointed with a battery chamber and a switch, wherein at least a bulb is located at a bottom end of the tubular body; a bundle of conductive cords is arranged between the bulb and the battery chamber and controlled by the switch to or not to lighten the bulb; and a pull knob is resided at an upper end of the tubular body; and
    a central shaft penetratingly plugged in the tubular body, wherein an upper end of the central shaft protrudes over the upper end of the tubular body; a multiheaded claw is disposed at a bottom end of the central shaft; an outer diameter encircled by a plurality of fully extended claws of the multiheaded claw is greater than the bore of the tubular body; a resilient member is hitched on the upper end of the central shaft; and a button is attached to the upper end of the central shaft so that two ends of the resilient member are propping against a bottom end of the button and a top end of the pull knob respectively;

wherein the claws of the multiheaded claw can fully spread outwardly when the pull knob is pulled to have the claws emerged from the tubular body, or the claws will be closed and retracted in the tubular body when the pull knob is released.

2. The multifunctional pick-up tool according to claim 1, wherein a flexible bar is disposed at the bottom end of the central shaft, and the plurality of claws is secured to the bottom end of the flexible bar.

3. The multifunctional pick-up tool according to claim 1, wherein the switch is disposed at the bottom end of the battery chamber.

4. The multifunctional pick-up tool according to claim 1, wherein a magnet is disposed at the bottom end of the tubular body.

* * * * *